(12) United States Patent
Chang et al.

(10) Patent No.: US 7,188,306 B1
(45) Date of Patent: Mar. 6, 2007

(54) SWOOPY TEXT FOR CONNECTING ANNOTATIONS IN FLUID DOCUMENTS

(75) Inventors: Bay-Wei W. Chang, Foster City, CA (US); Richard J. Goldstein, Menlo Park, CA (US); Polle T. Zellweger, Palo Alto, CA (US); Jock D. MacKinlay, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 791 days.

(21) Appl. No.: 09/794,100

(22) Filed: Feb. 28, 2001

(51) Int. Cl.
G06F 17/00 (2006.01)
G06F 15/00 (2006.01)
G06F 17/30 (2006.01)
G06F 7/00 (2006.01)

(52) U.S. Cl. .................... 715/512; 707/102; 707/104.1

(58) Field of Classification Search ................ 715/512, 715/526, 531, 540, 542, 517, 537; 707/102, 707/104.1; 345/467
See application file for complete search history.

(56) References Cited

U.S. PATENT DOCUMENTS

| | | | | |
|---|---|---|---|---|
| 5,146,552 A | * | 9/1992 | Cassorla et al. | 715/512 |
| 5,513,304 A | * | 4/1996 | Spitz et al. | 715/500 |
| 5,559,938 A | * | 9/1996 | Van Roekel et al. | 345/441 |
| 5,559,942 A | * | 9/1996 | Gough et al. | 345/802 |
| 5,689,717 A | * | 11/1997 | Pritt | 715/512 |
| 5,724,072 A | * | 3/1998 | Freeman et al. | 345/648 |
| 5,852,447 A | * | 12/1998 | Hosoya et al. | 345/468 |
| 6,041,335 A | * | 3/2000 | Merritt et al. | 715/512 |
| 6,185,582 B1 | * | 2/2001 | Zellweger et al. | 715/503 |

(Continued)

OTHER PUBLICATIONS

Chang et al, "A Negotiation Architecture for Fluid Documents", UIST '98, San Francisco, CA, 1998. (ACM 0-58113-034-1/98/11).*
Zellweger, et. al., "Fluid Links for Informed Incremental Link Transitions", Hypertext '98 Papers, 1998, pp. 50-57. (ACM 1998 0-89791-972/6/98).*
Zellweger, et. al., "Fluid Links for Informed Incremental Hypertext Browsing", CHI 99, May 15-20, 1999, pp. 7-8. (ACM ISBN: 1-58113-158-5).*
Zellweger, et. al., "The Impact of Fluid Documents on Reading and Browsing : An Observational Study", CHI Letters vol. 2, issue 1, CHI 2000, Apr. 1-6, 2000, pp. 249-256. (ACM 2000 1-58113-216-6/00/04).*
Zhai, et al, "Graphical Means of Directing Users' Attention in the Visual Interface", Proceedings of INTERACT '97, Sydney Australia, Jul. 14-18, 1997, pp. 59-66.*

(Continued)

*Primary Examiner*—Shahid Alam
*Assistant Examiner*—Robert Stevens
(74) *Attorney, Agent, or Firm*—Oliff & Berridge, PLC; Eugene Palazzo

(57) ABSTRACT

A swoopy text method and system for generating and displaying curved text to connect primary source data with secondary data, including alternatively connecting different text streams, to augment the meaning of original text and/or to replace the meaning of the original text stream with secondary data.

23 Claims, 5 Drawing Sheets

U.S. PATENT DOCUMENTS

| | | | | |
|---|---|---|---|---|
| 6,230,170 | B1* | 5/2001 | Zellweger et al. | 715/512 |
| 6,279,017 | B1* | 8/2001 | Walker | 715/529 |
| 6,297,017 | B1* | 10/2001 | Schmidt et al. | 435/6 |
| 6,332,148 | B1* | 12/2001 | Paine et al. | 715/512 |
| 6,389,434 | B1* | 5/2002 | Rivette et al. | 715/512 |
| 6,457,026 | B1* | 9/2002 | Graham et al. | 715/512 |
| 6,551,357 | B1* | 4/2003 | Madduri | 715/512 |
| 6,563,514 | B1* | 5/2003 | Samar | 345/711 |
| 6,567,830 | B1* | 5/2003 | Madduri | 715/512 |
| 6,584,479 | B2* | 6/2003 | Igarashi et al. | 715/512 |
| 6,803,913 | B1* | 10/2004 | Fushiki et al. | 345/467 |
| 2002/0116420 | A1* | 8/2002 | Allam et al. | 707/526 |

OTHER PUBLICATIONS

Zellweger, Polle T., et al., "Fluid Annotations in an Open World", Proceedings on the 12th ACM Conference on Hypertext and Hypermedia, Aarhus, Denmark, Sep. 2001, pp. 9-18 [ACM 1-59113-420-07/01/0008] (plus citation page).*

"Concrete Poetry", downloaded from www.liswa.wa.gov.au/liskidz/allsorts/concrete/, Sep. 28, 2006, 1 page.*

Parker, Roger C., Looking Good in Print: A Guide to Basic Design for Desktop Publishing, 3rd Edition, Ventana Press, RTP, NC, © 1993, pp. 84-85.*

Heller, Steven (ed.), et al., Texts on Type: Critical Writings on Typography, Allworth Press, New York, © 2001, (article reprint of "Typographical Topography" by Stefan Themerson, published in The Penrose Annual, London, 1965, vol. 58), pp. 183-192 and 267.*

Dodgson, The Rev. Charles Lutwidge (ed.), The Collected Verse of Lewis Carroll, The Macmillan Co., New York, © 1933, pp. 56-57.*

Prelutsky, Jack (ed.), The Random House Book of Poetry for Children, Random House, New York, © 1983, p. 42.*

Prelutsky, Jack, It's Raining Pigs and Noodles, GreenWillow Books, New York, © 2000. pp. 34-35.*

"Sunlight on Hair", downloaded from http://allpoetry.com/Poem/1835998, Nov. 13, 2006, pp. 1-5.*

* cited by examiner 34   53   52          40 a handful of planets circled in an endless elliptical dance. On one of these planets, there was a jungle, lush and green, filled with all manner of plant and animal. One of these animals was Harry the Ape, whose long red fur flew in the wind and gleamed in the morning sun. Harry was such a big ape that he didn't notice that on his foot lived a small brown, blue-eyed mouse, buried in his foot fur. The Mouse's name was Mary and Mary lived on the food that Harry dropped. Mary particularly loved banana peel which often fell like strips of slimy, stringy rain. In Mary's brown fur there lived a small, quiet spider by the name of Sam. Sam loved to eat the

FIG. 3

34   53   36  54        40 a handful of planets circled in an endless elliptical dance. On one of these planets, there was a jungle, dense and dark and filled with all manner of
53
    buzzing insects, smells (both fragrant and fetid), plants sharp to the
    touch, fruits juicy to eat and colorful animals - some camouflaged in
32  the foliage and other sticking out like brilliant jewels in the sun.
        One of these animals was Harry the Ape, whose long red fur flew in the wind and gleamed in the morning sun. Harry was such a big ape that he didn't notice that on his foot lived a small brown, blue-eyed

SWOOPY TEXT FOR CONNECTING ANNOTATIONS IN FLUID DOCUMENTS

BACKGROUND OF THE INVENTION

1. Field of Invention

The present invention relates to methods of computer mediated text and graphic display.

2. Description of Related Art

Fluid documents are documents in which information contained in the text of the document is connected to other text or other information such as, for example, annotated textual information. Related disclosures of fluid documents include co-pending U.S. Pat. No. 6,584,479 B1 and co-pending U.S. Pat. No. 6,230,170 B1, each incorporated herein by reference in its entirety.

Fluid document techniques disclosed in the '479 and '170 patents provide methods for dynamically presenting a primary body of data displayable on a graphical user interface and a supporting body of data relatable to the primary body of data. The primary body of data can include an annotation tag associated with a specific region and referring to the supporting body of data. When a region of user focus at or near the annotation tag is selected in the primary body of data, the supporting body of data is dynamically displayed, i.e., displayed for as long as the user focus is maintained on that region. The data present in the primary body of data are concurrently modified to enhance presentation of the supporting body of data. When the user focus changes, the annotation tag is restored and the primary body of data reverts to its original format.

The primary body of data can be primarily textual, primarily graphical, or some mixture of textual and graphical elements. Similarly, the annotation tag can be primarily textual, primarily graphical, or some mixture of textual and graphical elements. The annotation tags include numeric tags such as, for example, footnote numerals, greeked or unreadably small interlinear or marginal text, symbols such as, for example, an asterisk, hypertext links, or thumbnail graphics or drawings in the margin. In certain applications, the annotation tags can be a very small, yet still readable, version of the supporting body of data. In other applications, lines, curves, or graphical or textual animations can allow a user reviewing a primary body of data to identify the availability of supporting data. While typically a visual cue, in certain applications, the annotation tag can be visually imperceptible to the user until a pointer or other indicator of user focus is directed at a region to which the annotation tag is related. In certain applications, annotation tags can be based on auditory or tactile feedback, with, for example, sound, operation of force feedback mice, or tactile displays providing audio or tactile annotations.

User focus on an annotation tag can be determined by tracking the position of a conventional screen displayed pointer maneuverable by a mouse, a stylus, or a keyboard, by use of touch-sensitive overlays to a screen, eye or head tracking systems, or any other known or later developed mechanism for reliably determining a user's focus on a region of a graphical user interface display. Dynamic displaying supporting information relative to the user focus can be initiated in response to user-initiated mouse clicks, keyboard input, finger taps, duration (e.g. detecting that the cursor has been held still on or adjacent to an annotation tag for a certain period of time such as, for example, one tenth of a second to about two seconds, with one second being typical), or any other suitable input scheme for confirming a user's desire to view supporting bodies of data.

Modifying the primary body of data in response to the determined user focus to enhance presenting the supporting body of data while retaining an unobstructed, or at least minimally obstructed, view of the primary body of data requires accommodating the supporting body of data within the primary body of data. This accommodation requires that the supporting body of data "negotiate" with the primary body of data to determine suitable adjustments to the position, orientation, sizing, coloring, spatial morphology and/or other typographical or graphical characteristics of the primary or supporting body of data.

This accommodation overcomes a major problem associated with conventional hypertext window or "balloon help" techniques. Such annotation techniques simply overlay a small graphic or window over a primary body of data, often covering necessary information in the primary body of data. In contrast, the systems and methods disclosed in the '479 and '170 patents conduct a negotiation between the primary body of data and the supporting body of data to determine suitable alterations to the position, size, color and/or spatial morphology of text or graphics that best present salient portions of the primary body of data, while still allowing the supporting body of data to be viewed. Ideally, obstructions to viewing both the primary body of data and the supporting body of data can be minimized. However, in certain embodiments, partial obstruction of the primary body of data may be necessary to accommodate the presentation of salient information.

The '479 and '170 patents teach accommodating the supporting body of data can be obtained through overlaying or spatially morphing the primary body of data. An overlay presentation replaces the annotation tag with supporting data, while concurrently identifying the annotated region of the primary body by suitable callouts, lines, markers, or animations that place the annotation in the margin, interline, or interparagraph region, but still direct a user's attention to the related region of the primary body. Alternatively, the region of the primary body subject to annotation can be made visually distinct by a suitable color or font change. This allows, for example, a region of the primary body to be recolored, hue adjusted, or "grayed out", with the supporting data of the annotation positioned to lay on top of the now visually distinct region. Overlay presentations generally do not require repositioning words, lines, or paragraphs, and/or graphical elements in the primary body of data. Instead, overlay presentations rely on available space such as, for example, either "empty" marginal space or space created by "graying out" text, in the primary body of data.

As taught in the '479 and '170 patents, spatially morphing the primary body of data generally requires displacing or differentially resizing lines and words in a vicinity of an annotation tag subject to the user focus. The positions of words, lines, paragraphs, or graphical elements in the primary body of data are adjusted, as needed, using an animated transition to accommodate the supporting body of data. This allows supporting bodies of data to be presented at full readable size, while still retaining the context of the primary body of data. This may include dynamically decreasing typesize of lines in the region near the annotation tag, or providing intraline or interline intercalations (i.e., insertions) of auxiliary symbols, words, and/or sentences. One or more words, lines, paragraphs, graphical elements, and/or margins can be moved to make room for annotations or other supporting data.

As pointed out in the '479 and '170 patents, it should be appreciated that methods of those related applications can be employed to aid in creating marginal notes, interlineations, graphics, handwriting, and/or other suitable annotations. A primary body of data is displayable on a graphical use interface, permitting a user to select a region of user focus for annotation. Using a keyboard, pen-operated touchpad, voice control software, or other suitable input device, the user provides supporting data input to be associated with a selected region of user focus. To aid in creating the annotation, the displayed body of primary data is modified. This modification can include overlay presentations in which the area to be annotated (i.e., associated with the supporting body of data input by the user) is color-highlighted or grayed-out, or alternatively, can include spatial morphing presentation techniques in which lines of the primary body of data are moved to accommodate positioning textual or handwriting input.

SUMMARY OF THE INVENTION

The related '479 and '170 patents disclose placing annotations near, such as, for example, just below the annotated location, but do not connect the textual flow of the annotated main text and the annotation. One type of fluid document, known as a margin callout fluid document, connects the annotated main text with the annotation using a line drawn from one to the other.

This invention provides systems and methods that modify the primary body of data in response to user focus to "content-connect" the primary body of data to a secondary body of data such as, for example, alternative text or modified primary text, and may displace one or more portions or streams of the primary body of text.

This invention separately provides systems and methods for creating and embedding one or more secondary bodies of data into a primary body of data.

In various exemplary embodiments of the systems and methods according to this invention, the shape of the portions of the primary and/or secondary bodies of data are changed by curving or "swooping" those portions of the primary and/or secondary bodies of text to display a selected secondary body of text such that the secondary body of data becomes physically connected to content of the primary body of data. Portions or streams of the primary body of data are displaced. One or more secondary bodies of data may augment the curved primary body of data and/or may be substituted for the displaced primary body of data. The systems and methods of this invention display one or more secondary bodies or streams of data to augment the content of an original body or stream of data and/or to replace the content of an original body or stream of data. It should be appreciated that the systems and methods of this invention can be used to aid in creating alternate endings to stories or portions of stories, and/or to modify the content or meaning of a text portion in a primary data stream.

In various exemplary embodiments of the methods and systems according to this invention, a primary body of data is displayed on a graphical user interface. A user can select a region of user focus. In response, a transition data portion is generated to connect the primary data stream with a secondary body of data displayed based on the selected region of user focus. This secondary body of data can include, for example, an alternative body of data or a body of data that modifies the content and/or meaning of primary data stream.

In other various exemplary embodiments, a user can add, using a keyboard, a pen-operated touchpad, voice control software, or other suitable input device, one or more secondary bodies of data, such as, for example, alternative text or modified text, to be associated with the region of user focus. The primary data stream is modified by generating the transition data portion, for example, by changing a selected portion of the primary data stream into a curved format that connects the primary data stream to the secondary body of data.

Additional functions, objects, advantages, and features of the present invention will become apparent from consideration of the following description and drawings of exemplary embodiments.

BRIEF DESCRIPTION OF THE DRAWINGS

These and other features and advantages of this invention are described in, or are apparent from, the following detailed description of various exemplary embodiments of the systems and methods according to this invention.

FIG. 3 is one exemplary embodiment of a text stream that incorporates alternate text streams with associated user focus regions displayable using the systems and methods of this inventions;

FIG. 4 shows the text stream of FIG. 3 after one of the alternative text streams has been selected for display;

DETAILED DESCRIPTION OF EXEMPLARY EMBODIMENTS

Figure 1:
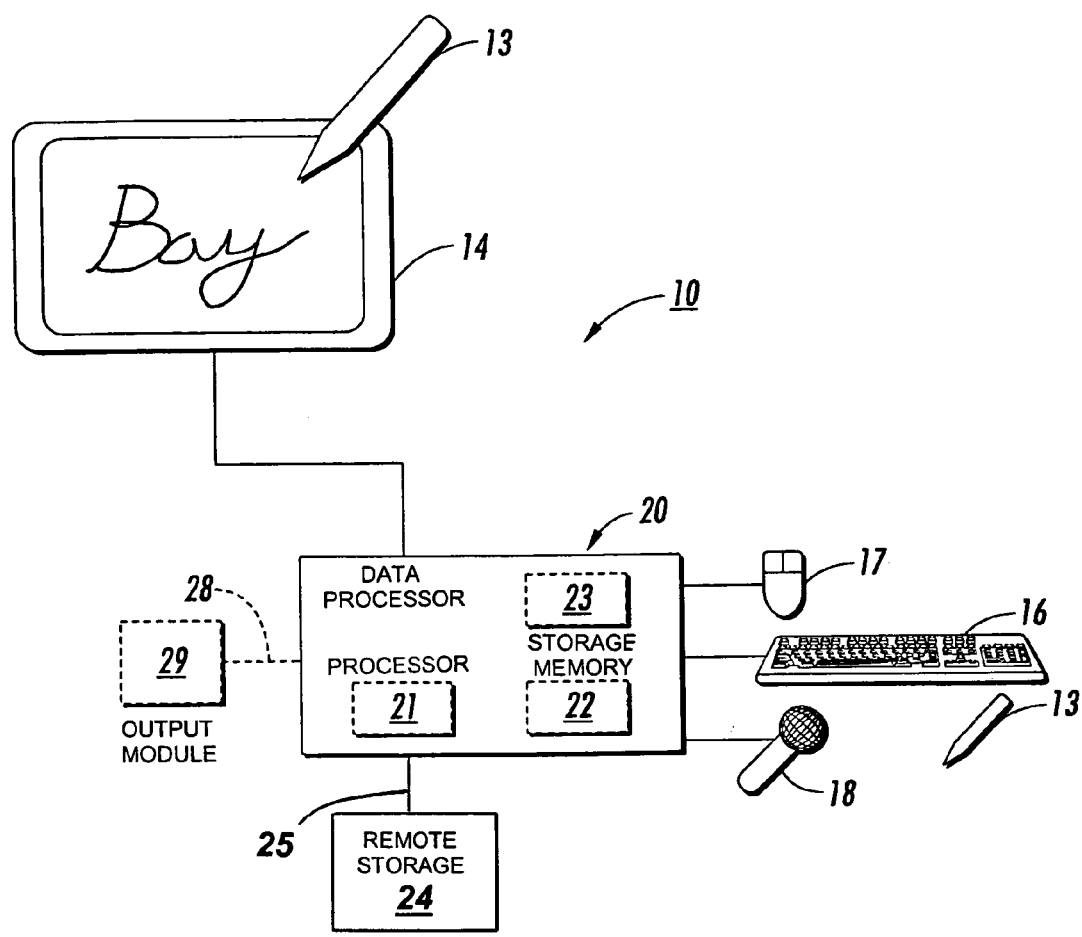
FIG. 1 is a schematic view of a computer and electronic display system usable with the systems and methods according to this invention.

As illustrated with respect to FIG. 1, a system 10 includes a data processor 20 connected to a display device 14. The data processor 20 includes a processor 21, electronic memory 22, and long term storage 23. The data processor 20 is connected to one or more devices, including a pen device 13, a conventional keyboard 16, a mouse device 17, microphones 18 for audio input, pen-based or gestural input devices, paper scanning input, or any other supported input mechanism.

In addition to visual display output through the display device 14, various non-visual computer output is possible with an output module 29, which may include but is not limited to audio output, tactile output, force feedback output (with force feedback mice or joysticks), text and graphics printers, or any other suitable output mechanism.

The data processor 20 can be connected to the output module 29 over a link 28, and to a remote data storage device 24 over a link 25. The links 25 and 28 can be any known or later developed device or system for connecting the data processor 20, including a direct cable connection, a connection over a wide area network or a local area network, a connection over an intranet, a connection over the Internet, or a connection over any other distributed processing network or system. In general, the links 25 and 28 can each be any known or later developed connection system or structure usable to connect the remote data storage device 24 and the output module 29, respectively. Further, it should be appreciated that the links 25 and 28 connecting the links 25 and 28 to the data processor 20 can each be a wired or wireless link to a network (not shown). The network can be a local area network, a wide area network, an intranet, the Internet, or any other distributed processing and storage network.

Figure 2:
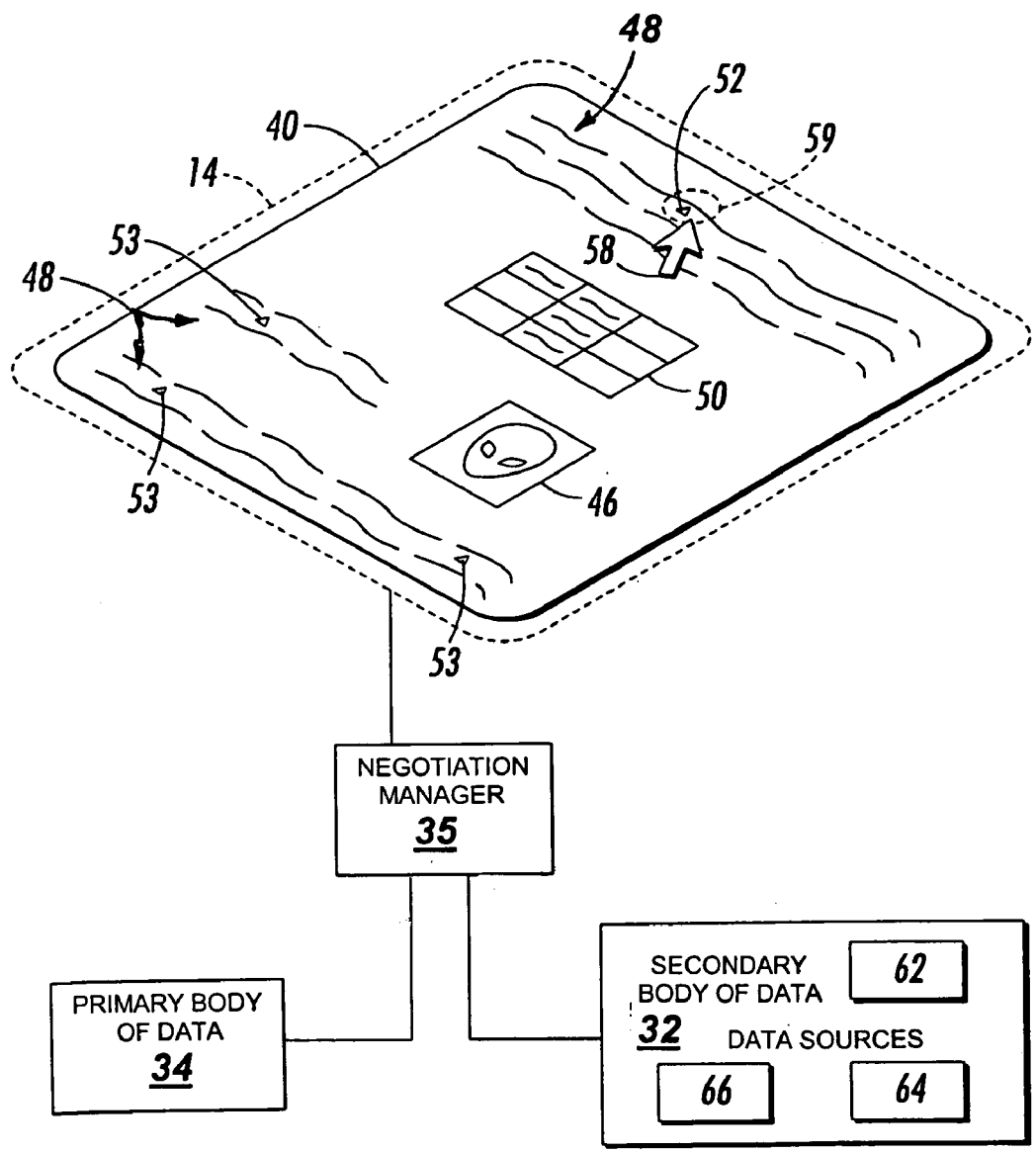
FIG. 2 is a schematic view illustrating a text and graphics display view, a visual representation of a primary body of data, and a visual representation of a body of data usable with the systems and methods according to this invention and capable of being integrated with primary body of data to together provide the text and graphics display view.

It should also be appreciated that the system disclosed in FIGS. 1 and 2 can be implemented as including a portable and/or hand-held computer device.

As shown in FIG. 2, the display device 14 presents a graphical user interface or window display 40 to a user. The display 40 is created by negotiation, using a negotiation manager 35, between a primary body of data 34 and a supporting body of data 32, which is derived from various sources of data 62, 64, or 66. The negotiation manager is, in various exemplary embodiments, implemented as a software module executing on the data processor 20.

As shown in FIG. 2, the display 40 includes a text portion 48 and a graphics portion 46, a table 50, and various user focus tags 52 and 53. The selected user focus tag 52, which is associated with secondary data from one of sources of data 62, 64, or 66 can be selected by moving a cursor 58 into a region of user focus 59. When the selected user focus tag 52 is activated, an animated launch sequence is initiated that results in a secondary text portion being displayed as part of the text portion 48 using a transition portion, such that the content of the secondary text portion flows from the content of the text portion 48 at the selected user focus tag 52. The expansion animation typically takes anywhere from about a quarter second to about two seconds, but can be any appropriate period of time sufficient to allow a user to keep visual track of the expanding text change and maintain proper contextual focus. When user focus changes by moving the cursor 58, or by otherwise de-activating the selected and activated user focus tag 52, the user focus tag 52 is restored and the primary body of data reverts to its original format by a reverse, contracting animation. As will be appreciated, the animation speed can be fully controllable, with higher speed "pop-up" display textual changes being presented for brief segments of text, and longer text changes being used for more complex text changes extending far from the user focus tag.

As will be appreciated, data shown in the display 40 can include text, graphics, or mixtures of textual and graphical elements, such the table 50. In various exemplary embodiments of the systems and methods of this invention, the displayed primary body of data 34 may be text, such as electronic mailnotes, novels, software code, or poetry, and/or graphical data such as maps, photographs, or geographic information systems. Applications employing substantial amounts of both text and graphics, such as illustrated textbooks, instruction manuals, or spreadsheets, are also suitable display candidates.

In various exemplary embodiments, the secondary data 32 can include text that defines one or more alternative endings for a primary data stream of text or can include text that modifies the primary text with changed content and/or meanings for portions of primary text stream. An alternative ending or a modified primary text portion or stream can include data obtained from a hypertext-linked destination or from any location, including from the local memory or storage, and combinations of these as well as other information. In various exemplary embodiments, logical or relational structures such as may be provided by character or paragraph formatting, or spreadsheet constraint graph information, can be used to provide the alternative endings or modified text data of the primary body for data 34.

Similarly, the user focus tags 52 and 53 can be primarily textual, primarily graphical, or some mixture of textual and graphical elements. Contemplated user focus tags 52 and 53 include numeric tags such as, for example footnote numerals, greeked or unreadably small interlinear or marginal text, symbols, such as, for example, an asterisk or a star shaped symbol, or thumbnail graphics or drawings in the margin. In various exemplary applications, the user focus tags 52 or 53 can be very small, yet still readable, versions of the supporting body of data 32.

In various exemplary applications, the user focus tag 52 or 53 can be visually imperceptible to the user until a pointer or other indicator of user focus is directed at the region 59 associated with the tags 52 or 53. For example, the user focus tags 52 or 53 can be based on auditory or tactile feedback, such as may be provided by a non-visual output module 29, with, for example, sound, operation of force feedback mice, or tactile displays providing audio or tactile user focus tags 52 or 53.

In addition to the cursor 58, user focus regions 59 can be selected and/or activated by using one of the input devices 13 and 16–18, any associated touch sensitive overlays to a screen display, eye or head tracking systems, audio input, or any other conventional mechanism for reliably determining that the user has selected a region 59 of the display 40 that is associated with a tag 52 or 53. Dynamical displaying the supporting body of data 32 associated with the user focus can be initiated in response to user-initiated mouse clicks, keyboard input, finger taps, duration, such as, for example, the cursor 58 being held still on or adjacent to a user focus tag 52 or 53 for a predetermined or dynamically determined period of time, or any other suitable input scheme for confirming a user's desire to view the supporting body of data associated with the selected and activated user focus tag 52 or 53. In various exemplary embodiments, the predetermined period of time is about one tenth of a second to about two seconds, with one second being typical.

It should be appreciated that modifying the primary body of data 34 in response to a determined user focus to generate the transition portion and to present the supporting body of data 32 requires accommodating the display of the secondary body of data 32 within the display of the primary body of data 34. This accommodation requires that the supporting body of data 32 "negotiate" its display location within the display 40 with the primary body of data 34 using negotiation module 35 to generate the transition portion between the primary and secondary bodies and to determine suitable adjustments to the position, the orientation, the sizing, the coloring, and/or other typographical or graphical characteristics of the primary body of data 34 and/or the secondary body of data 32. A brief animation can be displayed after a user indicates interest in a user focus tag 52 or 53. This involves forming the transition portion, displacing the display locations of subsequently located portions of the primary body of data 34, and connecting the transition portion to the alternative or modified text or other secondary data 32 at its display location within the display 40.

Advantageously, this accommodation allows the secondary body of data 32 to be displayed on the display 40 at full readable size, while still retaining the context of the primary body of data 34. The systems and methods in accordance with this invention effectively mediate the relative salience of the primary and secondary bodies of data 34 and 32. Initially, upon being displayed on the display 40, only the primary body of data 34 is displayed within the display space of the display 40. The supporting bodies of data are represented by the user focus tags 52 and 53 display. When the user focuses on one of the user focus tags 52 and 53, the associated secondary data 32 will be inserted into the primary body of data 34. In particular, the inserted secondary body of data 32 will be content-connected to the preceding portion of the primary body of data 34 at the location of the selected user focus tag 52 or 53 using the transition portion.

In various exemplary embodiments, the transition portion is formed by curving, or "swooping", a portion of the preceding portion of the primary body of data 34 until it connects to the inserted secondary body of data, by curving, or "swooping" a portion of the secondary body of data until it connects to the preceding portion of the primary body of data 34, or some combination of the two. It should also be appreciated that the inserted secondary body of data 32 can also, or alternatively, be connected in the same way with the subsequent portion of the primary body of data 34.

It should be appreciated that the specific implementations and design parameters used during negotiation between the primary body of data 34 and the secondary body of data 32 depends on the particular application. The primary body of data 34 and secondary body of data 32 can be modified by various overlay techniques in which the primary body of data 34 does not substantially change its original size, space, or position other than becoming content-connected to the secondary body of data 32 using a transition portion, or by various spatial morphing techniques in which the primary body of data does substantially change its original size, space, or position as long as it becomes content-connected to the secondary body of data 32 using the transition portion. Overlay techniques advantageously minimize disorientation of the user by minimizing changes to the displayed primary body of data 34, while spatial morphing techniques can enhance recognition of the secondary body of data 32 and generally allow more information from both the primary body of data 34 and secondary body of data 32 to be concurrently displayed within the display 40.

FIG. 3 depicts one exemplary embodiment of a primary body of data 34 having a number of user focus tags 52 and 53. As shown in FIG. 3, the primary body of data 34 is a text stream displayed on a display device 14 such as, for example, a computer or electronic display screen. In addition to the primary text 34 being displayed, a number of the user focus tags 52 and 53 are shown associated with particular portions of the primary text 34. In this exemplary embodiment, the user focus tags 52 and 53 are shown as a triangle. The user focus tags 52 and 53 may be accentuated or highlighted in one or more suitable ways, such as, for example, by being of a color, either chromatic or achromatic, which is the same as or different from that of the text, by brightness or contrast level with respect to the text or display background, or any other known or later developed perceptible characteristic.

To create the content connection between a preceding portion of the primary text 34 and a secondary text 32 associated with that preceding portion of the primary text 34, a user determines what words or phrases or clauses or sentences are to make up the transition portion, such as, for example, the curved or "swoopy" portion. The user identifies the selected text portion, which is to be curved or "swooped", to connect to the associated secondary text 32 and to the primary text 34 at the location of the associated user focus tag 52 or 53. The user then selects one or more words or other text elements in the preceding portion of the primary text 34, such as, for example, the last word in the preceding portion of the primary text 34, generates and embeds an associated user focus tag 52 or 53 with the selected one or more words or other text elements.

The user typically continues to do this throughout the primary text 34 to identify a number of "swoopy" text portions. The user associates a user focus tag, 52 or 53, such as, for example, an embedded symbol or icon, with each such "swoopy" text portion. The result of this is shown in FIG. 3.

FIG. 4 shows the text stream of FIG. 3 after the selected user focus tag 52 has been activated to display the associated alternative text stream. When a reader of the displayed text stream 34 activates the user focus tag 52 shown in FIG. 3, the text portion that has been identified as the transition portion for that user focus tag 52 curves down, or "swoops", and connects to a newly-displayed secondary text 32 that is associated with the selected and activated user focus tag 52. This secondary text augments or replaces some or all of the content of the primary text 34 that follows the activated user focus tag 52. Significantly, the content of the secondary text 32 is directly connected to the content of the primary text 34 at the location of the activated user focus tag 52. That is, the content of the text displayed as the secondary text 32 continues the content of the primary text 34 into which the secondary text 32 is inserted in a grammatically and semantically consistent manner. Thus, the primary and secondary texts 34 and 32 are "content connected."

As shown in FIG. 4, the transition portion "there was a jungle" 36 of the primary text 34 that precedes the selected and activated user focus tag 52 has become curved, swooping down two lines. At approximately the same time, the primary text "lush and green, filled with all manner of plant and animal.", which previously immediately followed the text "there was a jungle" in FIG. 3, has been removed from being displayed on the display 40. In its place, a new-displayed, secondary text 32, comprising: "dense and dark and filled with all manner of buzzing insects, smells (both fragrant and fetid), plants sharp to the touch, fruits juicy to eat and colorful animals—some camouflaged in the foliage and other sticking out like brilliant jewels in the sun." has been inserted immediately after the "swoopy" text "there was a jungle", in indented format. Additionally, the next sentence of the original text 34 remains in the display, but has been indented to start a new paragraph.

It should be appreciated that replacing the succeeding text to the end of the sentence in which the swoopy text appears is just one exemplary embodiment of this invention. Many other text replacement options exist, such as replacing the text to the end of a phrase, clause, sentence, paragraph or document, etc.

The extent and manner in which primary text is inserted and/or replaced in response to selecting and activating a particular user focus tag 52 or 53 can be predetermined by the author of the primary text, the author of the secondary text, and/or can be determined dynamically depending on the user's previous interaction with the primary text 34.

In particular, the user focus tag 52, which indicates that there is a secondary text 32 associated with the adjacent portion of the primary text 34, has been replaced with a restore user focus tag 54. This restore user focus tag 54, when activated, restores the primary text 34 to the state shown in FIG. 3. It should also be appreciated that this secondary portion 32 itself contains one or more user focus tags 52 and 53. Thus, this secondary text 32 is itself a primary text 34 for some additional secondary text portions 32.

The "swoopy" transition portion of the text 36 is the curved portion of text. The transition portion of the text 36 may be suitably highlighted, such as, for example, by color, either chromatic or achromatic, the same or different than the color of the selected and activated user focus tag 52 or other displayed text. The "swoopy" text, i.e., the curved portion of text, may also fade in or fade out or appear using any conventional cinematographic special effect, for example. In other exemplary embodiments, the original text, which was removed from being displayed, may remain in a suitable location on the display screen as long as it is identified in some manner as being the replaced or modified text. Such text may be identified by being displaced vertically or horizontally or be intercalated with added text while being highlighted, or remain in a crossed-through or bracketed manner, for example.

While the preceding exemplary embodiment used the secondary text to replace succeeding text, another exemplary embodiment may merely augment the content and/or meaning of the succeeding text. Another exemplary embodiment may replace at least part of the following text and modify at least part of the following text.

Figure 5:
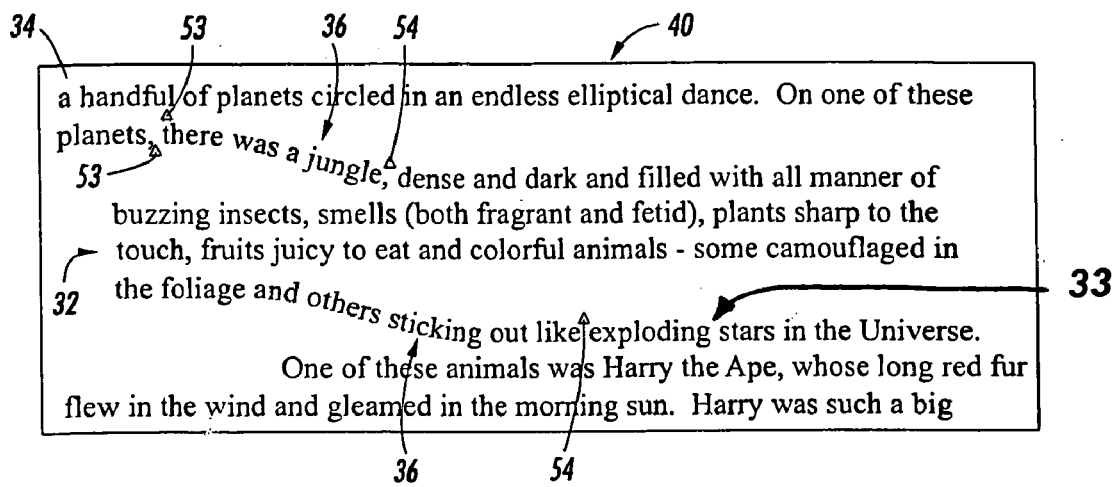
FIG. 5 shows the text stream of FIG. 4 after one of the alternative text streams in the alternative text portion has been selected for display.

FIG. 5 shows the text stream of FIG. 4 after one of the user focus tags 52 in the displayed alternative text portion 32 has been selected for display. In particular, FIG. 5 shows that the primary text 34 can include two or more levels of secondary text 32. Thus, as shown in FIG. 5, upon a user selecting and activating the user focus tag 52 shown in FIG. 4, the original secondary text portion "brilliant jewels in the sun." is replaced with a new secondary text 33 comprising "exploding stars in the universe.", while the preceding text "others sticking out like" associated with the selected and activated user focus tag 52 is curved as the "swoopy" transition portion 36. At approximately the same time, the selected and activated user focus tag 52 is replaced by a second restore user focus tag 54. It should be appreciated that activating the second restore user focus tag 54 in FIG. 5 returns the displayed text to the state shown in FIG. 4, while activating the first restore user focus tag 54 returns the displayed text to the state in FIG. 3. Each level of secondary text 32 added at the end of the transition portion 36, may benefit from using highlighting. For example, different colors or levels of brightness may be used to help differentiate the different swoopy text portions. Moreover, because, in various exemplary embodiments, transition portion 36 is curved or "swoopy", it becomes easier for a reader to recognize that a secondary text portion 32 has been displayed and understand that the text following the transition portion 36 represents alternative text content.

As noted above, the original text following the point where the "swoopy" text 36 occurs may be removed from being displayed, or be faded to such a brightness level so that it cannot be readily seen. This makes the secondary text 32, e.g., an alternative ending, easier for a reader to follow. Another technique which may be used with any of the preceding exemplary embodiments is to change the size of the secondary text 32 following the "swoopy" text 36, so that a new ending may grow or shrink as one views it.

Additionally, as shown in FIG. 4, the secondary text 32 added following the swoopy text 36 may be indented to various degrees to help distinguish it from the surrounding primary text 34. Other means of differentiating the secondary text 32 added after the "swoopy" text 36, or the "swoopy" text 36 itself, from the primary text 34 include using different fonts, a border, and a background color.

Figure 6:
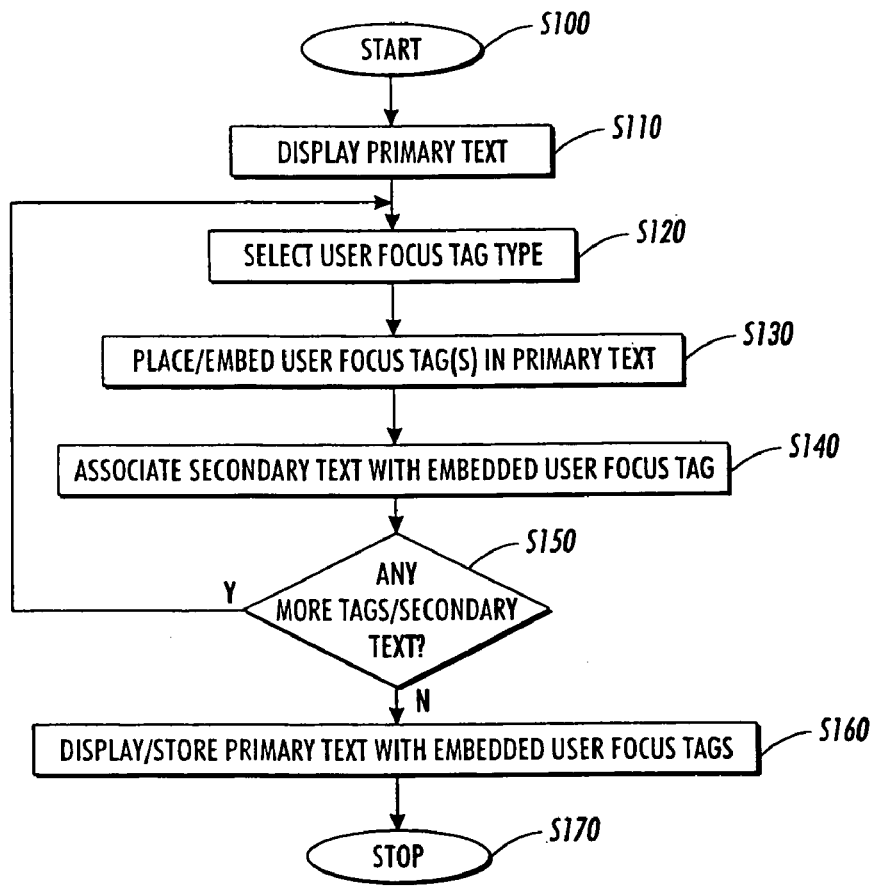
FIG. 6 is a flowchart illustrating one exemplary embodiment of a method for authoring primary text having user focus tags according to this invention.

FIG. 6 is a flowchart illustrating one exemplary embodiment of a method for authoring a primary body of data having user focus tags according to this invention. Beginning in step S100, control continues to step S110, where a primary body of data is displayed. Next, in step S120, an author selects one or more types of user focus tag to embed into the primary body of data. Then, in step S130, the author embeds one or more user focus tags into the primary body of data. Control then continues to step S140.

In step S140, an author creates or identifies a secondary body of data and associates that secondary body of data with the user focus tag selected in step S120 and embedded in step S130. Then, in step S150, a determination is made if any other tags and associated secondary body of data are to be embedded. If yes, control returns to step S120 and the author selects another tag. If not, control proceeds to step S160, where the authored and tagged primary body of data is stored and/or displayed. Then, in step S170, the process ends.

Figure 7:
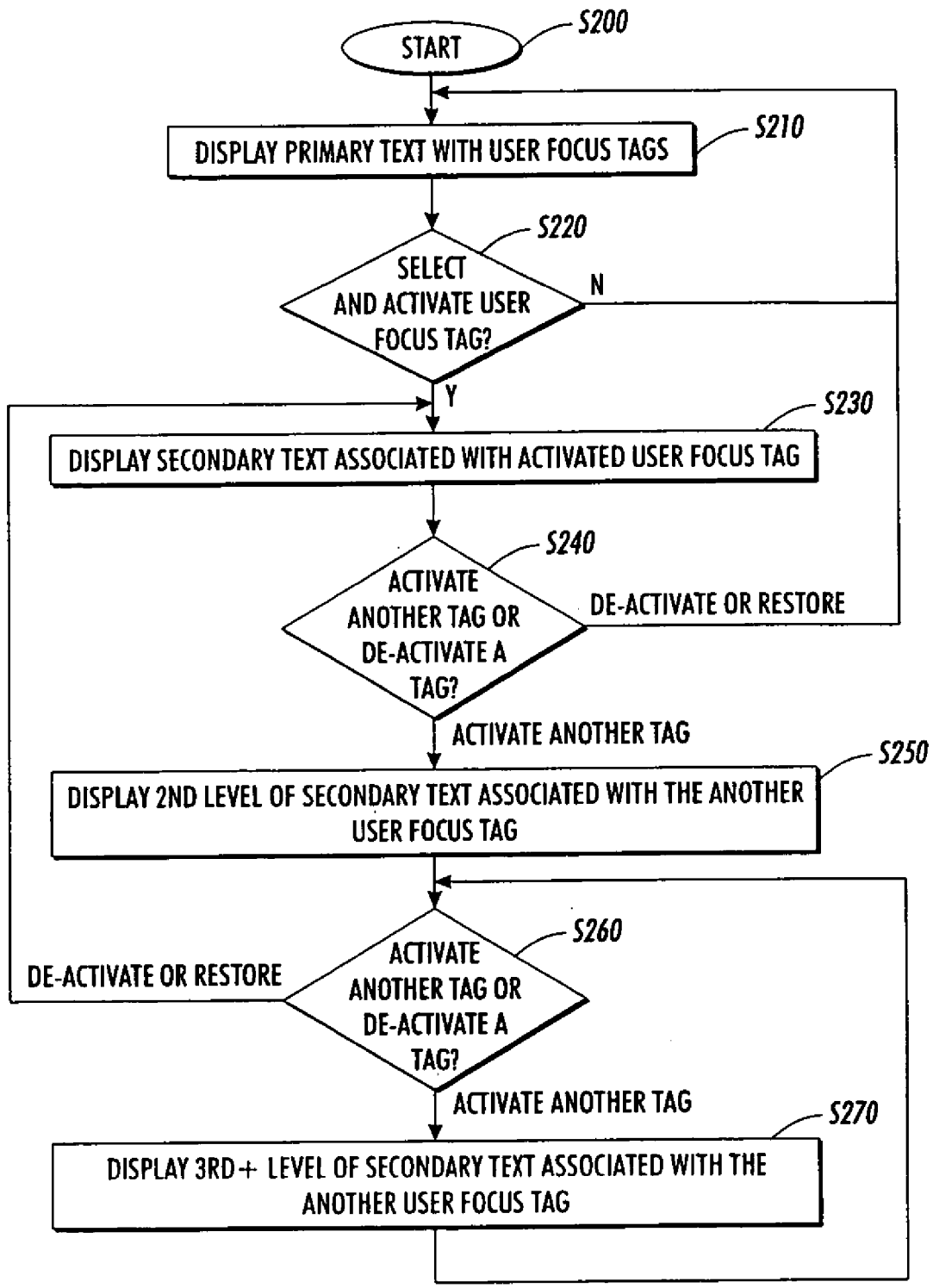
FIG. 7 is a flowchart illustrating an exemplary embodiment of a method for displaying secondary bodies of data associated within primary body of data having user focus tags.

FIG. 7 is a flowchart illustrating an exemplary method of using the invention to display secondary bodies of data. Beginning in step S200, control goes to step 210 to display a primary body of data, which has embedded user focus tags. Then, in step S220 a determination is made whether a user focus tag has been activated. If a user activates a focus tag, such as, for example, by clicking on it with a mouse, control goes to step S230 to display the primary text stream with a first level of swoopy text. Otherwise, control returns to step S210. From step S230 control goes to step S240 where a user decides whether to activate another user focus tag or to deactivate the last activated user focus tag. If a user decides to activate another user focus tag in step S240, control goes to step S250 and displays another, second, level of swoopy text. If, however, a user chooses in step S240 to de-activate or restore the previously activated user focus tag, control goes back to step S210 and displays the original primary text. If the second level of swoopy text is displayed in step S250, control jumps to step 260 where a user decides whether to activate another user focus tag of to deactivate the previous activated user focus tag. If a user deactivates/restores the previous activated user focus tag, in step S260, control reverts to step S230 and displays the original swoopy text. However, if a user activates another user focus tag in step S260, then control jumps to step S270 and displays a third level of swoopy text.

The systems and methods of this invention contemplate displaying any number of levels of swoopy text, and to deactivating one or more levels of secondary text at a time, depending on which user focus tag is deactivated. This invention also contemplates permitting a user to browse backward and forward through previous levels of secondary text, like a typical internet browser.

As shown in FIG. 1, the system according to this invention is preferably implemented on a programmed general purpose computer. However, the system according to the invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 6 and 7, can be used to implement the methods of this invention.

As shown in FIG. 1, the memory 22 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits shown in FIGS. 1 and 2 can be implemented as portions of a suitably programmed general purpose computer. Alternatively, each of the circuits shown in FIGS. 1 and 2 can be implemented as physically distinct hardware circuits within an ASIC, or using a FPGA, a PDL, a PLA or a PAL, or using discrete logic elements or discrete circuit elements. The particular form each of the circuits shown in FIGS. 1 and 2 will take is a design choice and will be obvious and predictable to those skilled in the art.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of displaying a primary body of data having at least one user focus tag on a display device and a secondary body of data being associated with the primary body of data, comprising:
    displaying at least a first content of the primary body of data;
    activating a selected tag of the at least one user focus tag, the selected tag being associated with the first content and having a tag location in the primary body of data;
    altering the first content at the selected tag into a swoopy text element that defines a curved connection to a second content of the secondary body; and
    displaying the second content of the secondary body of data connected through the swoopy text element to the primary body of data at the tag location.

2. The method of claim 1, wherein:
    replacing with the second content of the secondary body of data replaces from the displaying of a portion of the at least the first content of the primary body of data.

3. The method of claim 1, wherein: the second content of the secondary body of data appends to the first content.

4. The method of claim 1, wherein:
    altering the first content includes associating an icon with the first content.

5. The method of claim 1, wherein the first and second contents form a direct connection.

6. The method of claim 1, wherein altering the first content further includes:
    distinguishing the first content from at least one remaining portion of the primary body of data, the first content being readable along a reading direction from a text beginning to a text end;
    bending the first content to produce the altered text element; and
    shifting a remaining portion of the at least one remaining portion in a normal direction to the reading direction.

7. The method of claim 6, wherein bending the first content includes shifting the text end of the first content in the normal direction to the reading direction.

8. The method of claim 7, wherein displaying a second content includes appending the second content to the text end of the first content.

9. The method of claim 7, wherein displaying a second content further includes:
    selecting another tag of the at least one user focus tag, the another selected tag being associated with a sub-portion of the remaining portion and having another tag location within the remaining portion;
    distinguishing the sub-portion from another remaining sub-portion of the remaining portion by the another selected tag, the sub-portion being connected to the text end of the first content; and
    replacing the sub-portion with the second content.

10. The method of claim 6, wherein shifting the remaining portion further includes displaying a first remaining portion of the remaining portion and truncating a second remaining portion.

11. The method of claim 1, further comprising:
    repeating said activating, said altering and said displaying for a supplemental tag selected in the second content of the secondary body of data.

12. A system for creating swoopy text in a fluid document, comprising:
    a display device;
    a first display region, associated with the display device, for presenting a primary body of textual data and a secondary body of textual data, the primary body of textual data having a first text, the secondary body of textual data having a second text;
    a user focus tag embedded in the primary body of textual data and associated with the first text;
    a selector to select the user focus tag;
    a control device to alter the first text of the primary body of textual data associated with the user focus tag for displaying an altered text in a curved format, the altered text defining a curved connection to the second text;
    a negotiation element to associate the altered text in the curved format with the second text of the secondary body of textual data; and
    a second display region to show the altered text in the curved format connected to and associated with the second text of the secondary body of textual data.

13. The system of claim 12, wherein at least a portion of the secondary data replaces from the second display region the altered text of the primary body of textual data.

14. The system of claim 12, wherein at least a portion of the secondary data enhances the altered text of the primary body of textual data.

15. The system of claim 12, wherein the association of the altered text with the secondary body of data is a direct connection.

16. The system of claim 12, wherein the control device distinguishes the first text from at least one remaining portion of the primary body of textual data, the first text being readable along a reading direction from a text beginning to a text end, wherein the control device bends the first text to produce the altered text in the curved format, and wherein the control device shifts a remaining portion of the at least one remaining portion in a normal direction to the reading direction.

17. The system of claim 16, wherein the control device bends the first text by shifting the text end of the first content in the normal direction to the reading direction from the first display region to the second display region.

18. The system of claim 17, wherein the negotiation element appends the second text to the text end of the altered text.

19. The system of claim 18, wherein the selector selects another user focus tag associated with a sub-portion of the primary body of textual data, and the negotiation element replaces the sub-portion with the second text.

20. The system of claim 16, wherein the control device truncates a non-displayed-portion of the at least one remaining portion of the primary body of textual data from the first display region.

21. A method of displaying a primary body of data having at least one user focus tag on a display device and a secondary body of data being associated with the primary body of data, the method comprising:
    displaying at least a first content of the primary body of data;
    activating a selected tag of the at least one user focus tag, the selected tag being associated with the first content and having a tag location in the primary body of data;
    altering a line of the displayed first content at the selected tag into a swoopy text element that defines a curved connection to an additional line that follows the altered line; and
    displaying in the additional line a second content of the secondary body of data connected through the swoopy text element to the altered line of the primary body of data at the tag location,
    wherein the curved path of the swoopy text element varies in slope between the altered line and the additional line that have substantially no variation in slope.

22. The method of claim 21, wherein characters in the altered line are substantially collinear with at least a first set of characters at one of two ends of the swoopy text element and characters in the additional line are substantially collinear with at least a second set of characters at the other of the two ends of the swoopy text element, wherein characters in the altered line and characters in the additional line are formed along lines that are substantially parallel to each other.

23. The system of claim 22, wherein the selected tag corresponds to one of a position on the altered line at which the altered line ends and the swoopy text begins and a position on the additional line at which the swoopy text ends and the additional line begins.

* * * * *